(12) United States Patent
Motomochi et al.

(10) Patent No.: US 8,678,430 B2
(45) Date of Patent: Mar. 25, 2014

(54) AIRBAG DEVICE AND AIRBAG FOLDING METHOD

(75) Inventors: Akihiro Motomochi, Tokyo (JP); Masaki Terada, Tokyo (JP); Yasumasa Kamiya, Aichi (JP); Tomohiro Suekuni, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/527,967

(22) Filed: Jun. 20, 2012

(65) Prior Publication Data

US 2012/0326421 A1 Dec. 27, 2012

(30) Foreign Application Priority Data

Jun. 24, 2011 (JP) .................................. 2011-141055
May 8, 2012 (JP) .................................. 2012-106381

(51) Int. Cl.
*B60R 21/205* (2011.01)
*B60R 21/237* (2006.01)

(52) U.S. Cl.
USPC .......................... 280/743.1; 280/732; 493/405

(58) Field of Classification Search
USPC ................ 280/728.2, 729, 732, 743.1, 743.2; 493/405
See application file for complete search history.

(56) References Cited

U.S. PATENT DOCUMENTS

| | | | | |
|---|---|---|---|---|
| 5,348,343 A * | 9/1994 | Hawthorn | ................... | 280/730.1 |
| 5,613,698 A * | 3/1997 | Patercsak et al. | .......... | 280/728.1 |
| 5,636,861 A * | 6/1997 | Orsulak et al. | ............. | 280/730.1 |
| 6,176,509 B1 * | 1/2001 | Kawaguchi et al. | ........ | 280/728.1 |
| 6,186,544 B1 * | 2/2001 | Igawa | ......................... | 280/743.1 |
| 6,474,686 B1 | 11/2002 | Higuchi et al. | | |
| 6,619,691 B1 * | 9/2003 | Igawa | ............................ | 280/732 |
| 6,739,622 B2 * | 5/2004 | Halford et al. | ............. | 280/743.1 |
| 6,877,772 B2 | 4/2005 | Fischer et al. | | |
| 7,614,655 B2 * | 11/2009 | Hasebe | ....................... | 280/743.1 |
| 7,631,894 B2 * | 12/2009 | Hasebe et al. | ............. | 280/743.2 |

(Continued)

FOREIGN PATENT DOCUMENTS

DE 198 18 490 A1 11/1998
JP H08-108816 A 4/1996

(Continued)

OTHER PUBLICATIONS

Extended Search Report issued in counterpart European Application No. 12 17 2921.4 dated Oct. 11, 2012 (7 pages).

*Primary Examiner* — Toan To
*Assistant Examiner* — Laura Freedman
(74) *Attorney, Agent, or Firm* — Fitch, Even, Tabin & Flannery, LLP

(57) ABSTRACT

Provided are an airbag device and an airbag folding method capable of enhancing deployment performance of an airbag without using a separate component. An airbag includes a restraint portion to be located in front of an occupant upon inflation and deployment, a base portion connected to an inflator, a top portion to be located on a windshield W side upon inflation and deployment, and a bottom portion to be located between the occupant and an instrument panel I upon inflation and deployment. The restraint portion is folded in a belt shape with a contact surface of the restraint portion for contact with the occupant facing up to form a flap portion, and the flap portion is folded to move while turning toward the occupant upon inflation and deployment of the airbag.

10 Claims, 9 Drawing Sheets

(56) References Cited

U.S. PATENT DOCUMENTS

| | | | |
|---|---|---|---|
| 7,766,373 B2* | 8/2010 | Fukawatase et al. | 280/729 |
| 7,793,975 B2* | 9/2010 | Fukawatase et al. | 280/743.1 |
| 7,878,534 B2* | 2/2011 | Kumagai et al. | 280/732 |
| 7,926,844 B2* | 4/2011 | Williams et al. | 280/743.1 |
| 8,308,188 B2* | 11/2012 | Kumagai et al. | 280/732 |
| 2008/0106081 A1* | 5/2008 | Fukawatase et al. | 280/741 |
| 2008/0122208 A1* | 5/2008 | Fukawatase et al. | 280/743.1 |
| 2011/0042922 A1 | 2/2011 | Miyata | |

FOREIGN PATENT DOCUMENTS

| | | |
|---|---|---|
| JP | 2000-247199 A | 9/2000 |
| JP | 2001-334900 A | 12/2001 |
| JP | 3406277 B2 | 5/2003 |
| JP | 2006-008083 A | 1/2006 |
| WO | 2007/017729 A1 | 2/2007 |

* cited by examiner

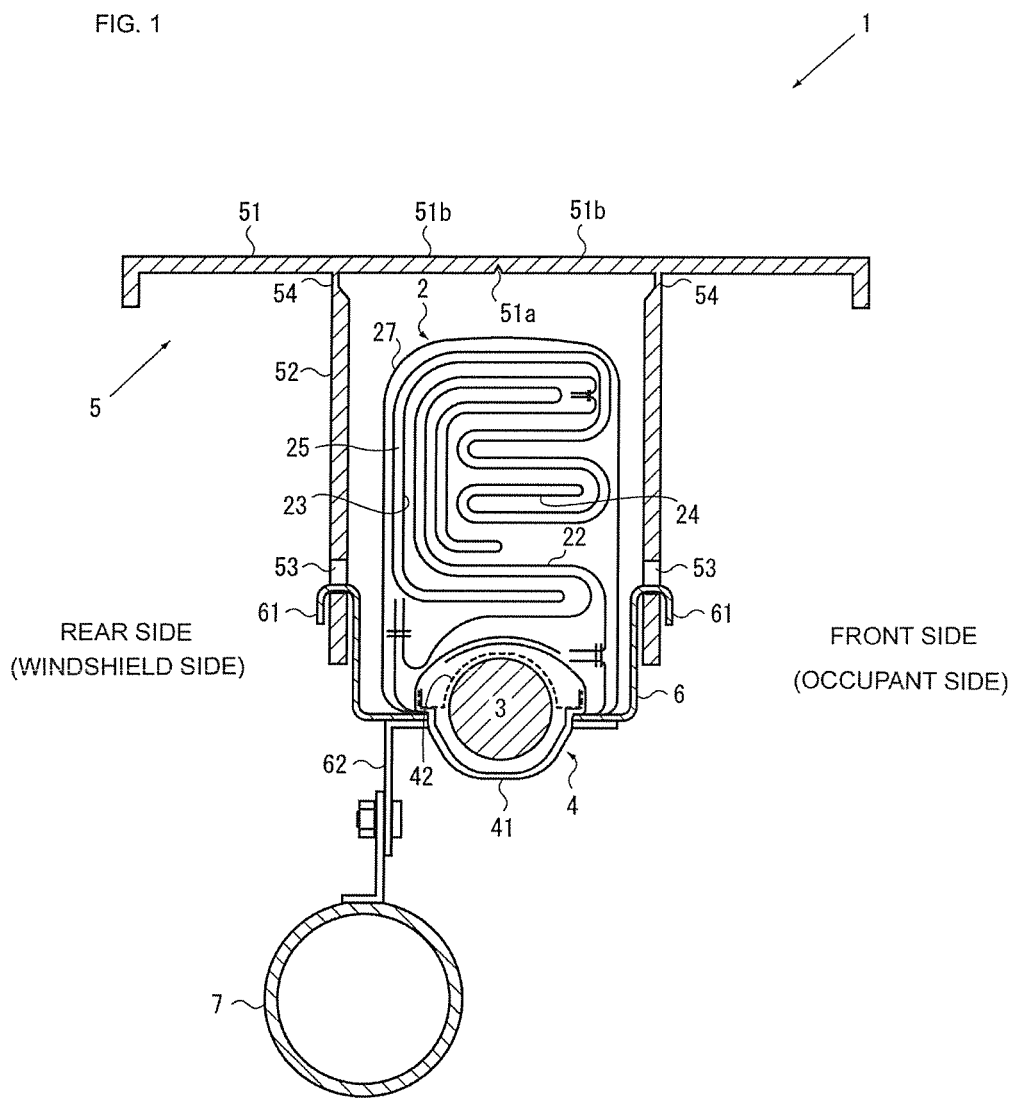

FRONT SIDE VIEW    CENTER SECTIONAL VIEW    BACK SIDE VIEW

FRONT SIDE VIEW    CENTER SECTIONAL VIEW    BACK SIDE VIEW

M-M SECTIONAL VIEW

M-M SECTIONAL VIEW

FRONT VIEW    CENTER SECTIONAL VIEW

FRONT VIEW    CENTER SECTIONAL VIEW

FRONT VIEW    CENTER SECTIONAL VIEW

PLAN VIEW    CENTER SECTIONAL VIEW

PLAN VIEW    CENTER SECTIONAL VIEW

PLAN VIEW    CENTER SECTIONAL VIEW

AIRBAG DEVICE AND AIRBAG FOLDING METHOD

CROSS-REFERENCE TO RELATED APPLICATIONS

This application claims priority under 35 U.S.C. §119 to Japanese Patent Application No. JP2011-141055, filed on Jun. 24, 2011, and Japanese Application No. 2012-106381, filed May 8, 2012, the entire content of which are hereby incorporated herein by reference in their entirety.

FIELD OF THE INVENTION

The present invention relates to an airbag device and an airbag folding method, and more particularly, to an airbag device and an airbag folding method capable of enhancing deployment performance of an airbag.

BACKGROUND OF THE INVENTION

It is becoming general to mount an airbag device in a vehicle such as an automobile for absorbing impact on the occupant by inflating and deploying an airbag in the vehicle in case of an emergency such as a collision or sudden deceleration. A typical airbag device includes an airbag that is folded in a normal state and is inflated and deployed in case of an emergency, an inflator for supplying gas to the airbag, a retainer for fixing the airbag and the inflator, and an airbag cover that holds the retainer and forms an opening of the airbag.

In a collision or sudden deceleration of a vehicle, the inflator supplies gas to the airbag to inflate the airbag, causing the airbag to tear. Then, the airbag is released in the vehicle while inflating and deploying. Particularly in a passenger airbag device, an airbag is inflated and deployed in a space surrounded by an instrument panel, a windshield (front glass), and an occupant.

As described above, the airbag is released in the vehicle after tearing a fragile portion of the airbag cover during the process of inflation and deployment, and therefore, it sometimes suddenly pops out into the vehicle at the moment the airbag cover is torn. In this case, if the occupant is in proximity to the instrument panel, the airbag inflating and deploying at high speed interferes with the occupant, thereby making it difficult to softly restrain the occupant. In general, in view of this, a folding method for the air bag is devised to inflate the airbag as upward as possible in an early stage of deployment to avoid interference with the occupant in proximity to the instrument panel. However, such a conventional method has a problem in that the inflating direction may become unstable due to a subtle difference in the folding method of the airbag. As described in Japanese Unexamined Patent Application Publication No. 2001-334900, the invention has already been proposed in order to prevent the airbag inflating at high speed in an early stage of deployment from interfering with the occupant.

In the invention described in Japanese Unexamined Patent Application Publication No. 2001-334900, a ballooning control sheet arranged between a folded airbag and an inner surface of a lid, one end of the ballooning control sheet being fixed to a retainer, covers the folded airbag from a rear side of a vehicle body toward a front side of the vehicle body, wherein the ballooning control sheet has a total length longer than a reference length, and wherein the reference length is defined as a length of an arc of a circle having a center immediately above a first reference point and passing through the first reference point, the first reference point being at a rear end of the lid in the longitudinal direction of the vehicle body, the circle being tangent at the second reference point to a front glass, and the arc being between the first and the second reference points on the rear side of the vehicle body. According to such a structure, inflation of the airbag toward the rear side of the vehicle body in an early stage of deployment can be restricted by the ballooning control sheet, and early interference between the airbag and the occupant can be avoided.

SUMMARY OF THE INVENTION

However, in the invention described in Japanese Unexamined Patent Application Publication No. 2001-334900, the ballooning control sheet is added as a separate component from the airbag, thereby causing some problems. For example, a production process is required separately from a production process for the airbag, the weight of the airbag device increases, and the folded volume of the airbag increases. Further, because the airbag is inflated as upward as possible and is then inflated and deployed downward or toward the occupant in order to avoid early interference between the airbag and the occupant, gas is apt to move up and down in the airbag, thereby causing the airbag to bounce up and down.

The present invention has been made in view of these problems, and an object of the invention is to provide an airbag device and an airbag folding method capable of enhancing deployment performance of an airbag without using a separate component.

The present invention provides an airbag device including an airbag that is folded in a normal state and is inflated and deployed in case of an emergency, an inflator for supplying gas to the airbag, and a retainer for fixing the airbag and the inflator. The airbag includes a restraint portion to be located in front of an occupant upon inflation and deployment, a base portion connected to the inflator, a top portion to be located on a windshield side upon inflation and deployment, and a bottom portion to be located between the occupant and an instrument panel upon inflation and deployment. At least the restraint portion is folded in a belt shape with a contact surface of the restraint portion for contact with the occupant facing up to form a flap portion, and the flap portion is are folded to move while turning toward the occupant upon inflation and deployment of the airbag.

For example, the flap portion is folded to cover the folded airbag from a vehicle rear side toward a vehicle front side. The bottom portion may be wrapped in the top portion such as to be confined from the vehicle front side. Further, the flap portion may include a portion obtained by folding in a belt shape a planar portion formed by the top portion and the bottom portion.

The present invention further provides an airbag folding method for an airbag in an airbag device including the airbag that is folded in a normal state and is inflated and deployed in case of an emergency, an inflator for supplying gas to the airbag, and a retainer for fixing the airbag and the inflator. The airbag includes a restraint portion to be located in front of an occupant upon inflation and deployment, a base portion connected to the inflator, a top portion to be located on a windshield side upon inflation and deployment, and a bottom portion to be located between the occupant and an instrument panel upon inflation and deployment. The airbag folding method includes a flatly spreading step of flatly spreading out the airbag so that the bottom portion, the top portion, and the restraint portion are stacked in this order; a first folding step of folding the base portion to be placed on the retainer, and forming a planar portion on the base portion from the top portion and the bottom portion by folding the airbag so that the restraint portion is located on the planar portion with a contact surface of the restraint portion for contact with the occupant facing up; a second folding step of forming a flap portion by folding both ends of the planar portion and the restraint portion inward to form the planar portion and the restraint portion in a belt shape having a width substantially equal to that of the retainer; a third folding step of folding a bottom portion side of the flap portion such as to be tucked under the base portion from a vehicle rear side; and a fourth folding step of pleating a remaining portion of the flap portion on the base portion and then folding a top portion side to cover the base portion from a vehicle front side.

In the third folding step, the bottom portion side of the flap portion may be rolled toward the inflator. In the fourth folding step, an end of the flap portion may be tucked under the base portion. Further, in the fourth folding step, a pleated portion of the flap portion may be tucked under the base portion. A wrapping step of wrapping the folded airbag in a wrapping member to maintain a shape may be provided after the fourth folding step.

According to the airbag device and the airbag folding method of the present invention described above, the flap portion including the restraint portion for contact with the occupant is formed, and the flap portion is folded to move while turning toward the occupant upon inflation and deployment of the airbag. Therefore, in the airbag released in the vehicle interior upon inflation and deployment, the flap portion moves while turning toward the occupant, the top portion is drawn out together, inflated, and deployed, and the bottom portion is finally inflated and deployed, so that inflation and deployment of the airbag can be completed. Thus the flap portion can control a behavior of the airbag during inflation and deployment by moving while turning, thereby preventing the airbag from bulging upward and interfering with the occupant in an early stage of deployment.

Since the flap portion is formed by folding a part of the airbag, there is no need to use a separate component. Therefore, a production process for a separate component can be eliminated, thereby preventing an increase in the weight of the airbag device and the folded volume of the airbag.

Because the top portion of the airbag is inflated and deployed along with turn of the flap portion, gas is prevented from moving upward and downward in the inflation process of the airbag, thereby reducing upward and downward bounce of the airbag.

Thus, according to the airbag device and the airbag folding method of the present invention, deployment performance of the airbag can be enhanced without using any separate component.

Further, since the folded airbag is covered with the flap portion from the vehicle rear side toward the vehicle front side, when the airbag is inflating and deploying, the flap portion can be pushed out and can be turned about the portion on the vehicle rear side.

By wrapping the bottom portion in the top portion such as to be confined from the vehicle front side, the airbag can be inflated and deployed in the order of the flap portion, the top portion, and the bottom portion.

Since the flap portion includes the planar portion formed by the top portion and the bottom portion, the airbag can be folded to easily form the flap portion.

By rolling the bottom portion side of the flap portion toward the inflator, a time lag can be caused in inflation and deployment of the rolled portion, and the rolled portion can be temporarily pressed against another in-vehicle structure (e.g., airbag cover) by inflation of the base portion, thereby forming a base point about which the flap portion turns.

Since the end of the flap portion is tucked under the base portion, the folded shape of the airbag can be easily maintained, and in particular, the folded shape of the flap portion can be stabilized.

Since the pleated portion of the flap portion is tucked under the base portion, the shape of the pleated portion can be stabilized.

By wrapping the folded airbag in the wrapping member, the folded shape can be stabilized, thereby making it easy to handle the airbag module in the production process of the airbag device.

BRIEF DESCRIPTION OF THE DRAWINGS

FIG. 1 shows a cross-sectional view of an airbag device according to a first embodiment of the present invention.

FIG. 2 shows inflation and deployment behavior of an airbag shown in FIG. 1, wherein

FIG. 3 shows the inflation and deployment behavior of the airbag shown in FIG. 1, wherein

FIG. 4 shows the airbag shown in FIG. 1, wherein

FIG. 5 shows a folding method for the airbag shown in FIG. 1, wherein

FIG. 6 shows a second folding step in the folding method for the airbag shown in FIG. 1, wherein

FIG. 7 shows the folding method for the airbag shown in FIG. 1, wherein

FIG. 9 shows a folding method for an airbag shown in FIG. 8, wherein

DETAILED DESCRIPTION OF THE PREFERRED EMBODIMENTS

Figure 2A:
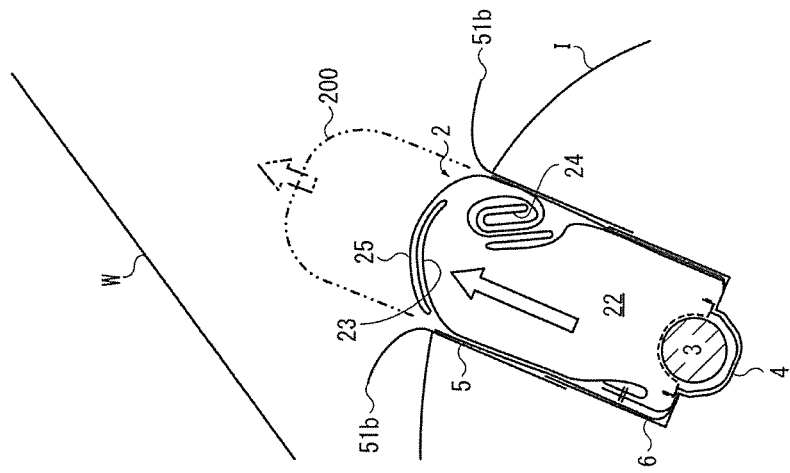
FIG. 2A shows a normal state.
Figure 2B:
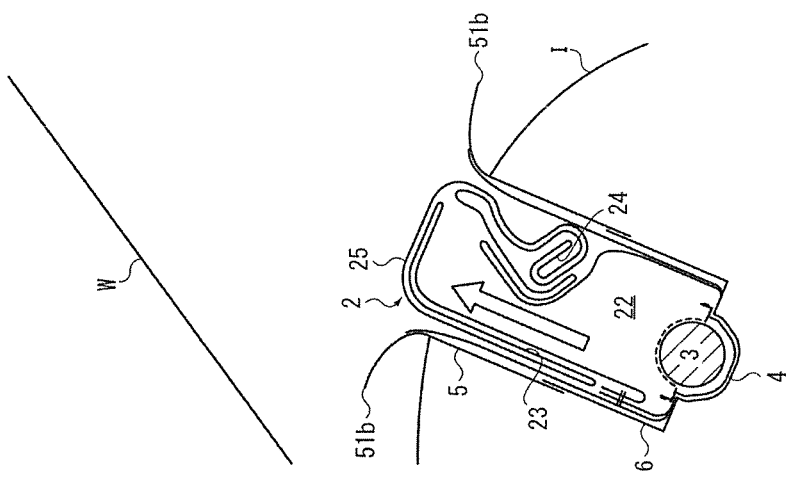
FIG. 2B shows a first stage.
Figure 2C:
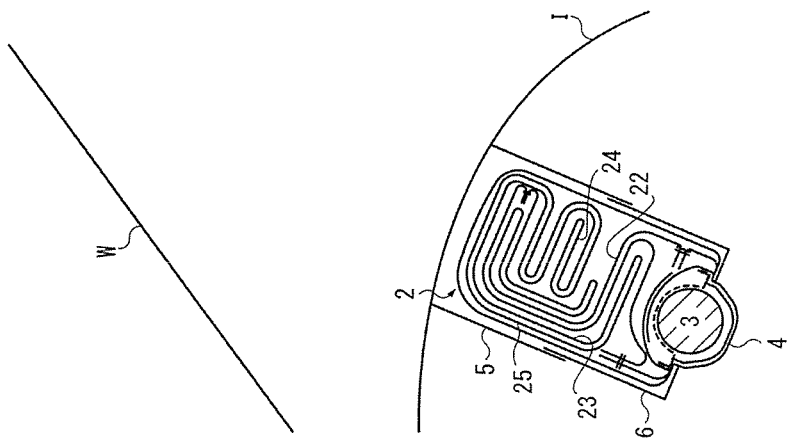
FIG. 2C shows a second stage.
Figure 3C:
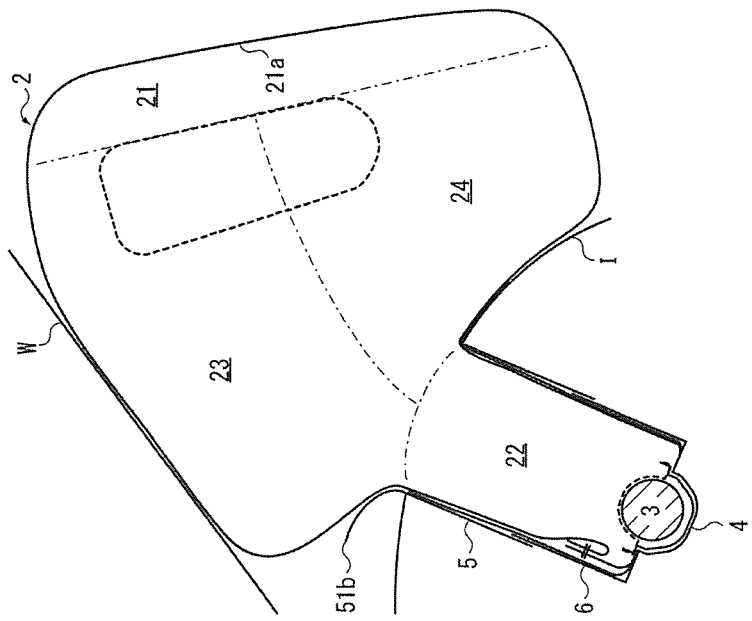
FIG. 3C shows a deployment completed state.
Figure 3B:
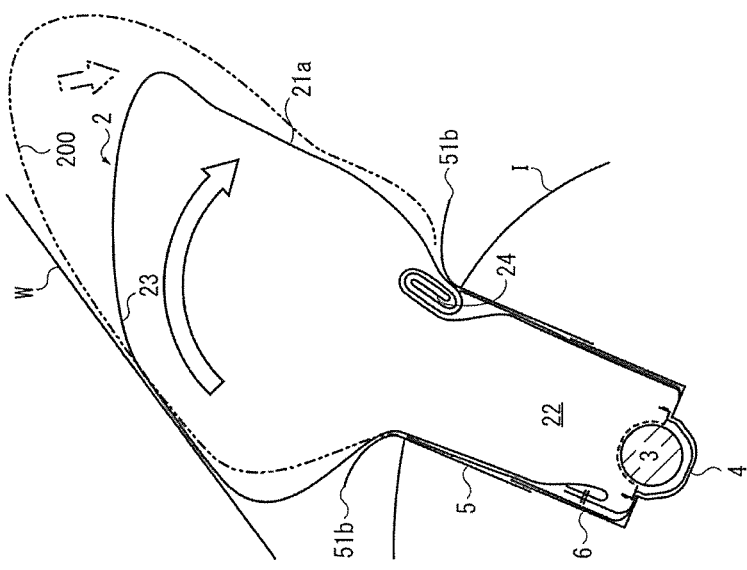
FIG. 3B shows a fourth stage.
Figure 3A:
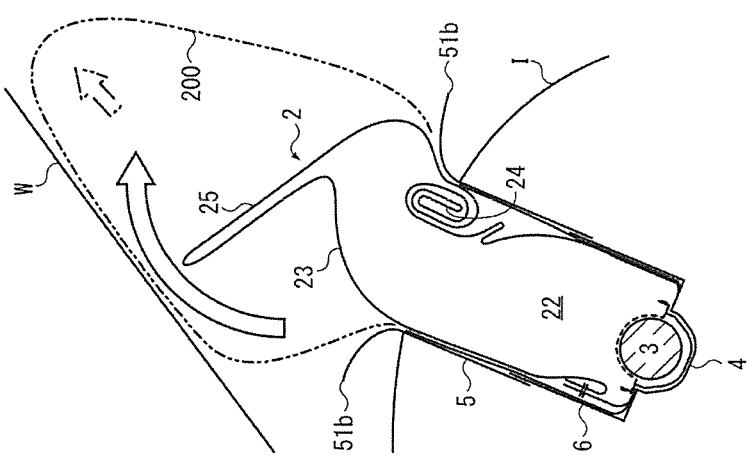
FIG. 3A shows a third stage.
Figure 4A:
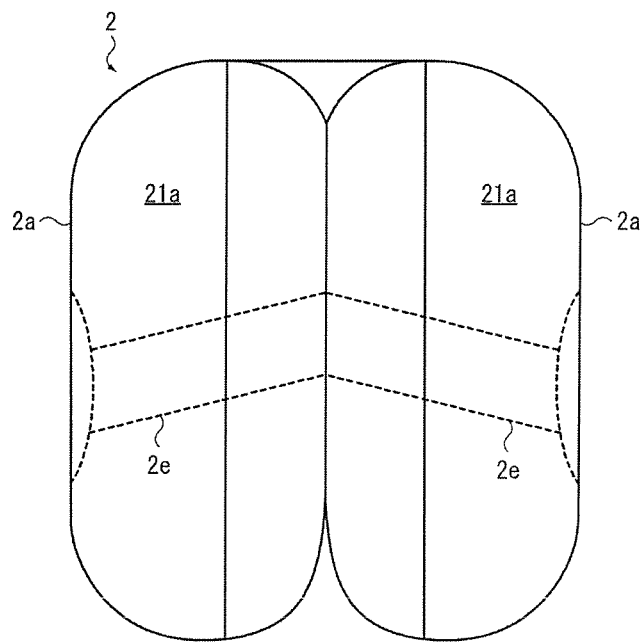
FIG. 4A shows a front view and FIG. 4B shows a horizontal sectional view.
Figure 4B:
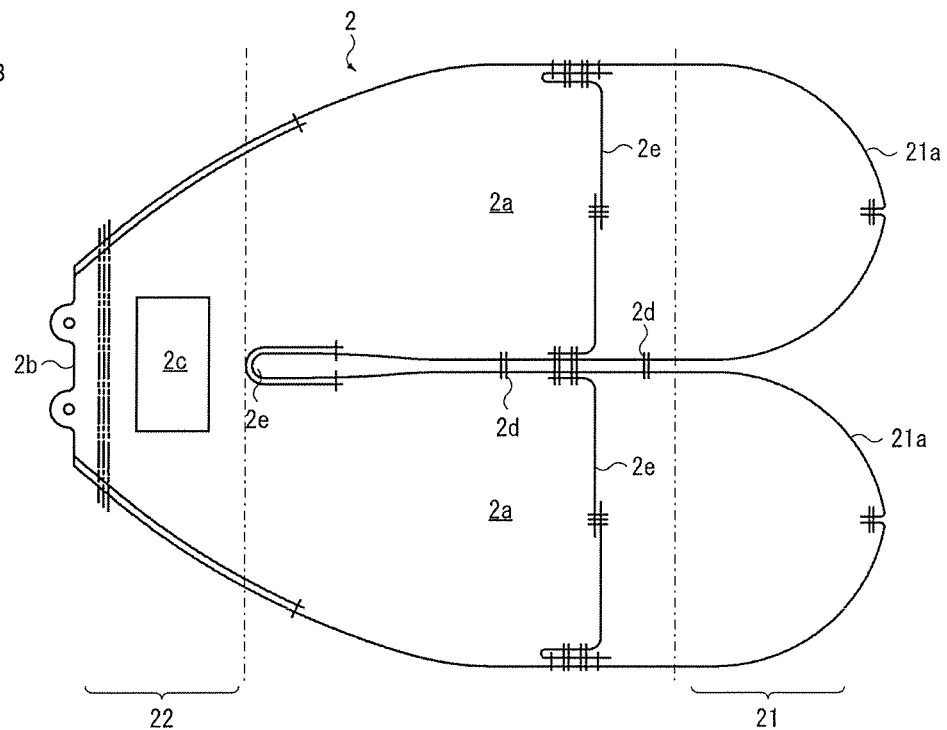

An airbag device 1 according to a first embodiment of the present invention will be described below with reference to FIGS. 1-7. FIG.1 shows a cross-sectional view of the airbag device according to the first embodiment of the present invention. FIG. 2 shows inflation and deployment behavior of an airbag shown in FIG. 1, wherein FIG. 2A shows a normal state, FIG. 2B shows a first stage, and FIG. 2C shows a second stage. FIG. 3 shows the inflation and deployment behavior of the airbag shown in FIG. 1, wherein FIG. 3A shows a third stage, FIG. 3B shows a fourth stage, and FIG. 3C shows a deployment completed state. FIG. 4 shows the airbag shown in FIG. 1, wherein FIG. 4A shows a front view and FIG. 4B shows a horizontal sectional view.

As shown in FIGS. 1-4, the airbag device 1 according to the first embodiment of the present invention includes an airbag 2 that is folded in a normal state and is inflated and deployed in case of an emergency, an inflator 3 for supplying gas to the airbag 2, and a retainer 4 for fixing the airbag 2 and the inflator 3. The airbag 2 includes a restraint portion 21 to be located in front of an occupant upon inflation and deployment, a base portion 22 connected to the inflator 3, a top portion 23 to be located on a windshield W side upon inflation and deployment, and a bottom portion 24 to be located between the occupant and an instrument panel I upon inflation and deployment. At least the restraint portion 21 is folded in a belt shape with a contact surface 21*a* of the restraint portion 21 for contact with the occupant facing up to form a flap portion 25. The flap portion 25 is folded to move while turning toward the occupant upon inflation and deployment of the airbag 2.

The airbag device 1 is a passenger airbag device, and is mounted in the instrument panel I disposed in the front of a passenger's seat, as shown in FIG. 2A. More specifically, as shown in FIG. 1, the airbag device 1 includes an airbag cover 5 for storing the airbag 2, the inflator 3, and the retainer 4. The retainer 4 is fixed to a holding case 6, and the airbag cover 5 retains the holding case 6. As shown in FIG. 1, a bracket 62 for fixing the airbag device 1 to an in-vehicle structure 7 is attached to the holding case 6. In FIG. 1, a rear side (windshield side) is shown on the left, and a front side (occupant side) is shown on the right.

As shown in FIG. 1, the airbag cover 5 is formed by integrally molding a plate-like portion 51 and an inner case 52. The plate-like portion 51 and the inner case 52 may be integrally formed by injection molding, or may be integrally formed by welding the inner case 52 to a back surface of the plate-like portion 51. The structure and shape of the airbag cover 5 are not limited to those shown in the drawing and can be appropriately selected from conventional ones, for example, the airbag cover 5 may be integrally formed with the instrument panel I, and the plate-like portion 51 may be inclined.

The plate-like portion 51 is, for example, a member forming a part of a vehicle interior surface of the instrument panel I. In an area of the plate-like portion 51 on an inner side of the inner case 52, a thin-walled tear line 51*a* is formed depending on the way the plate-like portion 51 is to split open upon inflation and deployment of the airbag 2. For example, when the tear line 51*a* is formed in a substantially H shape so that the plate-like portion 51 has a pair of door portions 51*b*, the door portions 51*b* split open in a double-door manner while turning about hinge portions 54. For example, the tear line 51*a* may be formed in a substantially angular U shape so that a single door portion opens.

The inner case 52 is formed by vertically arranged walls in a rectangular cylinder shape on the back surface of the plate-like portion 51. Further, the inner case 52 includes a plurality of holding holes 53 for retaining the holding case 6, and hinge portions 54 about which the door portions 51*b* turn. The holding case 6 has hooks 61 engageable with the holding holes 53. The hinge portions 54 are formed by connection portions between the plate-like portion 51 and the inner case 52, and for example, are formed by thin portions of the inner case 52, as shown in FIG. 1.

The inflator 3 is a gas generator for generating gas to be supplied to the airbag 2, and has a substantially columnar outer shape (cylindrical shape), for example. The inflator 3 is connected to an ECU (electronic control unit, not shown), and is controlled on the basis of a measurement value of an acceleration sensor or the like. When the ECU detects or predicts a collision or sudden deceleration of the vehicle, the inflator 3 is ignited by ignition current from the ECU, burns an agent stored in the inflator 3 to generate gas, and supplies the gas to the airbag 2. The shape of the inflator 3 is not limited to those shown, and may be a disc shape.

The retainer 4 includes a lower retainer 41 for supporting the inflator 3, and an upper retainer 42 disposed on an upper side of the inflator 3. The inflator 3 is placed between the lower retainer 41 and the upper retainer 42, and the lower retainer 41 and the upper retainer 42 are connected by fastening members, such as bolts, to clamp the inflator 3. A connection portion between the airbag 2 and the inflator 3 can be sealed by clamping a part of the airbag 2 between the lower retainer 41 and the upper retainer 42.

As shown in FIGS. 4A and 4B, the airbag 2 is, for example, a twin bag including a pair of inflatable portions 2*a* arranged side by side in a vehicle width direction. As shown in FIG. 4B, an opening 2*c* to be connected to the retainer 4 is formed on a base end 2*b* side of the airbag 2. A base portion 22 for communicating between the inflatable portions 2*a* is formed near the opening 2*c*. The pair of inflatable portions 2*a* are connected by sewn portions 2*d* to maintain a shape as an inflatable body. A tether 2*e* for regulating the shape in the width direction may be connected to each of the inflatable portions 2*a*.

The airbag 2 includes a contact surface 21*a* for contact with the occupant on a front surface and a restraint portion 21 at ends of the inflatable portions 2*a*. As shown in FIG. 3C, the airbag 2 also includes a top portion 23 and a bottom portion 24 between the restraint portion 21 and the base portion 22. The top portion 23 is located on the windshield W side and the bottom portion 24 is located between the occupant and the instrument panel I. The shape of the airbag 2 is not limited to that shown in the drawing, and the airbag 2 may have a vent hole for adjusting the internal pressure or may be formed as a single bag including an inflatable portion.

In the airbag 2, as shown in FIG. 1, the flap portion 25 is folded to cover the folded airbag 2 from the vehicle front side (windshield side) toward the vehicle rear side (occupant side). More specifically, the bottom portion 24 is wrapped in the top portion 23 such as to be confined from the vehicle front side (windshield side) and the top portion 23 is wrapped in the flap portion 25 such as to be confined from the vehicle front side (windshield side).

Figure 5A:
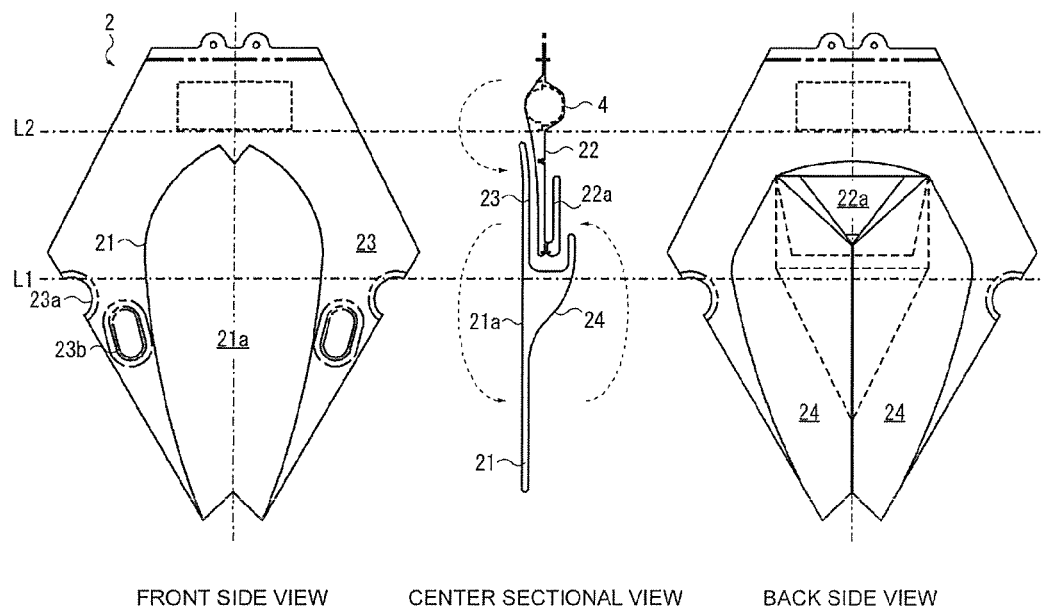
FIG. 5A shows a flatly spreading step.
Figure 5B:
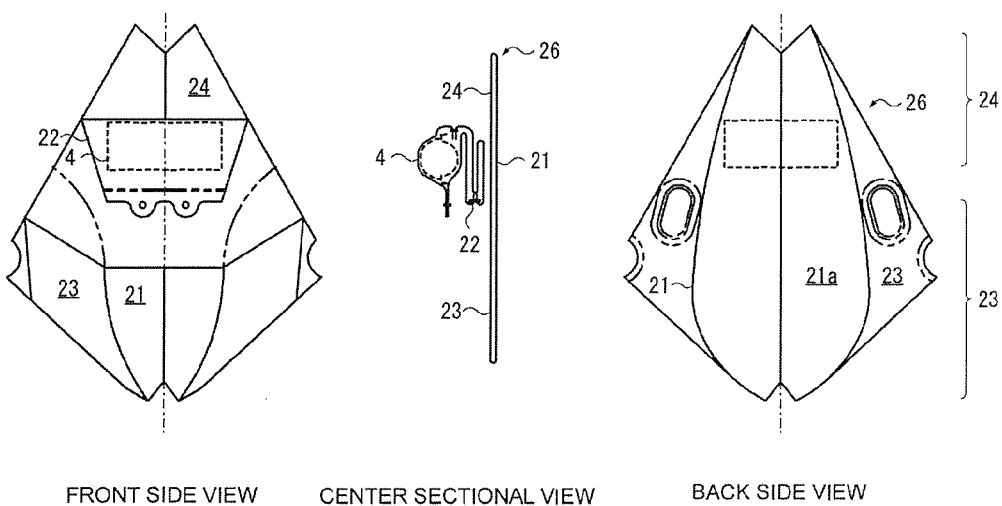
FIG. 5B shows a first folding step.
Figure 6A:
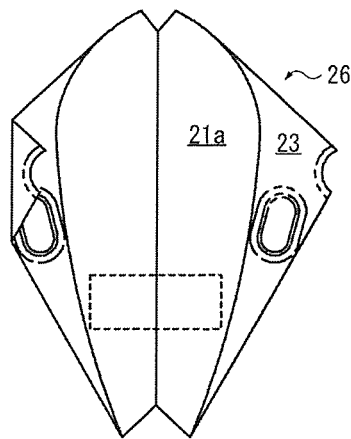
FIG. 6A shows a first stage.
Figure 6B:
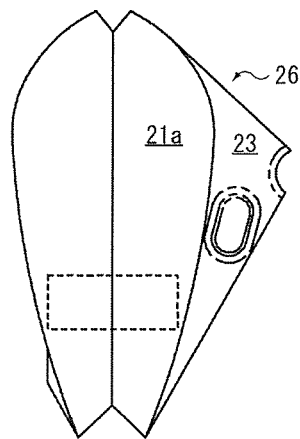
FIG. 6B shows a second stage.
Figure 6C:
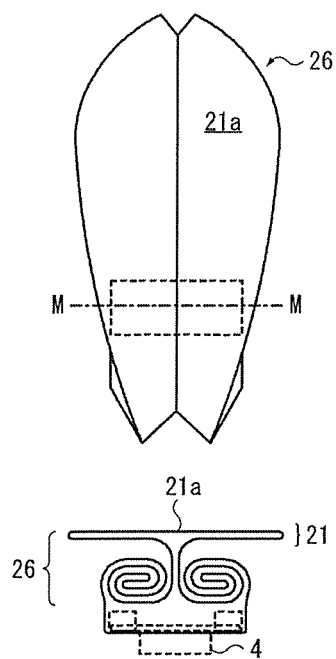
FIG. 6C shows a third stage.
Figure 6D:
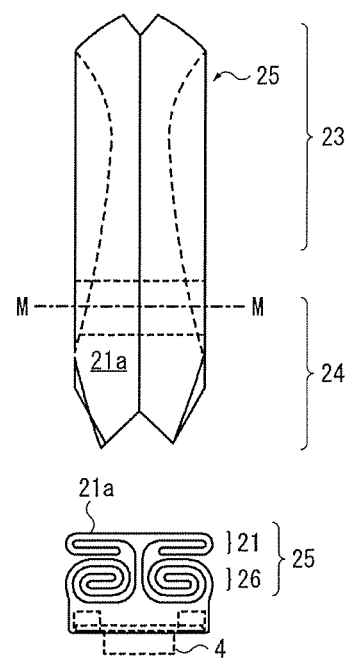
FIG. 6D shows a fourth stage.
Figure 7A:
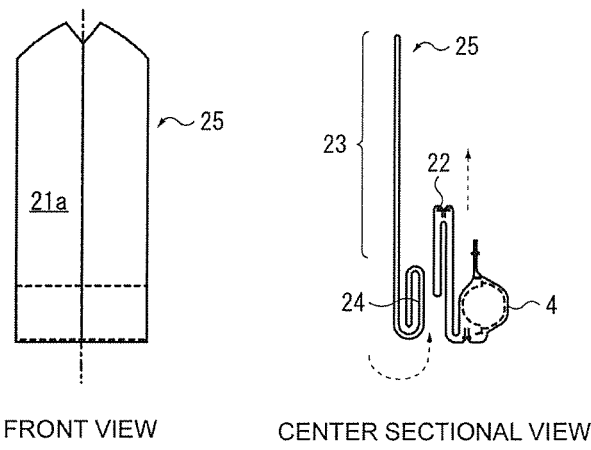
FIG. 7A shows a third folding step.
Figure 7B:
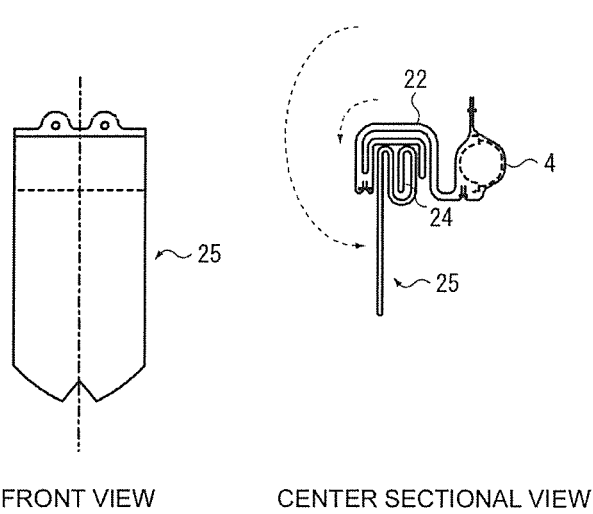
FIG. 7B shows a first stage in a fourth folding step.
Figure 7C:
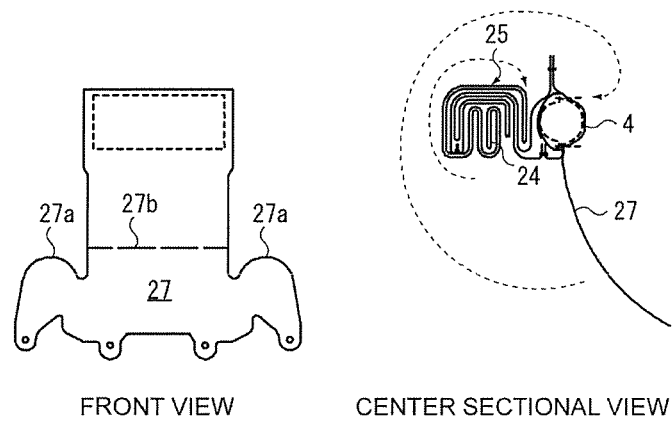
FIG. 7C shows a second stage in the fourth folding step.

A folding method for the airbag 2 will now be described with reference to FIGS. 5-7. FIG. 5 shows a folding method for the airbag shown in FIG. 1, wherein FIG. 5A shows a flatly spreading step, and FIG. 5B shows a first folding step. FIG. 6 shows a second folding step in the folding method for the airbag shown in FIG. 1, wherein FIG. 6A shows a first stage, FIG. 6B shows a second stage, FIG. 6C shows a third stage, and FIG. 6D shows a fourth stage. FIG. 7 shows the folding method for the airbag shown in FIG. 1, wherein FIG. 7A shows a third folding step, FIG. 7B shows a first stage in a fourth folding step, and FIG. 7C shows a second stage in the fourth folding step.

As shown in FIGS. 5-7, the folding method for the airbag 2 according to the embodiment includes a flatly spreading step of flatly spreading out the airbag 2 so that the bottom portion 24, the top portion 23, and the restraint portion 21 are stacked in this order; a first folding step of folding the base portion 22 to be placed on the retainer 4, and forming a planar portion 26 on the base portion 22 from the top portion 23 and the bottom portion 24 by folding the airbag 2 so that the restraint portion 21 is located on the planar portion 26 with the contact surface of the restraint portion 21 for contact with the occupant facing up; a second folding step of forming a flap portion 25 by folding both ends of the planar portion 26 and the restraint portion 21 inward to form the planar portion 26 and the restraint portion 21 in a belt shape having a width substantially equal to that of the retainer 4; a third folding step of folding a bottom portion 24 side of the flap portion 25 to be tucked under the base portion 22 from a vehicle rear side (occupant side); and a fourth folding step of pleating a remaining portion of the flap portion 25 on the base portion 22 and then folding a top portion 23 side to cover the base portion 22 from a vehicle front side (windshield side).

In the flatly spreading step shown in FIG. 5A, the airbag 2 sewn as a bag is flatly spread out on a working table. To easily maintain the folded shape of the airbag 2, the retainer 4 may be connected to the airbag 2 beforehand. FIG. 5A shows, from left to right, a front side view, a center sectional view, and a back side view. In the flatly spreading step, the airbag 2 is flatly spread by pushing down the airbag 2 from above while the contact surface 21a of the restraint portion 21 is being held. Thus, in the airbag 2, the bottom portion 24, the top portion 23, and the restraint portion 21 are stacked in this order in the direction from the back surface side toward the front surface side. In the flatly spread airbag 2, the base portion 22 is located between the top portion 23 and the bottom portion 24. As shown in the front side view, vent holes 23a and sewn portions 23b of the tethers 2e are disposed on side surfaces of the top portion 23. As shown in the back side view, a part of the base portion 22 is folded toward an inner side of the airbag 2 to form a tongue portion 22a projecting into the airbag 2.

In the first folding step shown in FIG. 5B, the flatly spread airbag 2 shown in FIG. 5A is folded along folding lines L1 and L2. More specifically, as shown in the center sectional view of FIG. 5A, the restraint portion 21 is turned from the front surface side toward the back surface side along the folding line L1, and the retainer 4 is turned onto the base portion 22 along the folding line L2. As a result, as shown in FIG. 5B, the airbag 2 is folded to have a substantially rhombic contour. FIG. 5B shows, from left to right, a front side view, a center sectional view, and a back side view. As shown in the center sectional view, the base portion 22 is pleated under the retainer 4, and the planar portion 26 is formed under the pleated base portion 22. A front surface of the planar portion 26 is formed by the restraint portion 21 (contact surface 21a), an upper portion on a back side (base portion 22 side) is formed by a part of the bottom portion 24, and a lower portion on the back side is formed by a part of the top portion 23. As shown in the back side view, the restraint portion 21 (contact surface 21a) and a part of the top portion 23 overlap with each other on the front surface of the planar portion 26.

In the following step, the airbag 2 is folded while the retainer 4 and the base portion 22 face down and the planar portion 26 faces up (the front surface and the back surface are reversed) and while the top portion 23 side of the planar portion 26 is located on an upper side and the bottom portion 24 side is located on a lower side (the airbag 2 is turned upside down).

In the second folding step shown in FIGS. 6A-6D, the lateral width of the airbag 2 is reduced so that the airbag 2 can be housed in the airbag cover 5. More specifically, one side of the top portion 23 and the bottom portion 24 forming the planar portion 26 is rolled upward in a first stage as shown in FIG. 6A, and is arranged to be hidden under the restraint portion 21 forming the planar portion 26 in a second stage as shown in FIG. 6B. The other side of the top portion 23 and the bottom portion 24 forming the planar portion 26 is similarly rolled and folded under the restraint portion 21 forming the planar portion 26 in a third stage as shown in FIG. 6C.

The restraint portion 21 forming the planar portion 26 is folded downward (toward the inflator side) to have a width equal to that of the rolled portion of the planar portion 26, as shown in a fourth stage of FIG. 6D. At this time, when the width of the restraint portion 21 forming the planar portion 26 is large, the restraint portion 21 may be rolled downward (toward the inflator side). Thus the planar portion 26 and the restraint portion 21 are folded to reduce the lateral widths thereof to the width substantially equal to that of the retainer 4 to form the flap portion 25 folded in a belt shape.

In the third folding step shown in FIG. 7A, a bottom portion 24 side of the flap portion 25 is folded to be housed in the airbag cover 5. The bottom portion 24 side of the flap portion 25 is rolled downward toward the pleated base portion 22 (toward the inflator side). At this time, a part of the pleated base portion 22 is drawn outward to support the rolled portion of the flap portion 25 using about half the size of the pleated base portion 22.

In the fourth folding step shown in FIGS. 7B and 7C, a top portion 23 side of the flap portion 25 is folded to be housed in the airbag cover 5. More specifically, the top portion 23 side of the flap portion 25 shown in FIG. 7A is folded once in a direction of an arrow in the figure, so that the remaining portion of the flap portion 25 is pleated on the base portion 22 as shown in FIG. 7B. At the same time, the part of the pleated base portion 22 drawn out in the third folding step is folded to cover the pleated part of the flap portion 25. That is, the pleated portion of the flap portion 25 is tucked under the base portion 22.

Subsequently, an end of the flap portion 25 projecting from the folded airbag 2 is folded in a direction of the arrow in FIG. 7C to cover the pleated portion of the base portion 22. At this time, when the end of the flap portion 25 is tucked under the pleated base portion 22, the shape of the folded airbag 2 can be maintained stably. As a result, the whole airbag 2 can be folded on the retainer 4 into a size such as to be housed in the airbag cover 5, as shown in FIG. 7C.

Finally, a wrapping step of wrapping the folded airbag 2 in a wrapping member 27 shown in FIG. 7C to maintain the shape may be added after the fourth folding step. More specifically, one end of the wrapping member 27 is caught by a fastening member, such as a bolt, attached to the retainer 4, and the other end of the wrapping member 27 is caught by an opposite fastening member to wrap the folded airbag 2. Alternatively, the entire surface of the airbag 2 may be covered with the wrapping member 27 by wrapping side surfaces of the airbag 2 in side faces 27a of the wrapping member 27 and catching the wrapping member 27 by the fastening members. Thus, an airbag module can be easily handled in the production process of the airbag device 1 by wrapping the airbag 2. For example, the wrapping member 27 is formed of the same material as foundation cloth for forming the airbag 2. A tear line 27b is formed in the middle of the wrapping member 27. The airbag 2 splits open along the tear line 27b upon inflation and deployment.

By folding the airbag 2 by the folding method as described above, the bottom portion 24 is wrapped in the base portion 22 such as to be confined from the vehicle front side (windshield side), the base portion 22 is wrapped in the top portion 23 such as to be confined from the vehicle front side (windshield side), and the top portion 23 is wrapped in the flap portion 25 such as to be confined from the vehicle front side (windshield side). That is, the flap portion 25 is folded to cover the folded airbag 2 from the vehicle front side (windshield side) toward the vehicle rear side (occupant side).

The airbag device 1 as shown in FIG. 1 is finally assembled by connecting the inflator 3 to the retainer 4, fixing the folded airbag 2, the inflator 3, and the retainer 4 to the holding case 6, and catching the holding case 6 in the holding holes 53 of the airbag cover 5.

Inflation and deployment behavior of the airbag 2 folded by the above-described folding method will be described with reference to FIGS. 2 and 3. In FIGS. 2C-3B, shapes shown by two-dot chain lines indicate, as a comparative example, inflation and deployment behavior of an airbag 200 of the related art.

In a normal state shown FIG. 2A, the vehicle does not have a collision or does not perform a sudden deceleration. The airbag 2 is kept in the instrument panel I with the airbag cover 5 fitted therein. The windshield W is located above and in front of the instrument panel I.

In case of an emergency such as a collision or sudden deceleration, the inflator 3 is activated to release gas into the airbag 2 in response to a command from the ECU (electronic control unit). The gas released into the airbag 2 inflates the base portion 22, pushes up the flap portion 25 folded on the base portion 22, and tears the airbag cover 5, as in a first stage of FIG. 2B.

When gas is further supplied into the airbag 2, the top portion 23 side of the flap portion 25 is pushed upward, thereby allowing the airbag 2 to be released in the vehicle, as shown in a second stage of FIG. 2C. Since the bottom portion 24 side of the flap portion 25 is rolled, it is difficult to unfold. This can cause a time lag in inflation and deployment. Thus the bottom portion 24 side is pushed out while remaining rolled, and is temporarily pressed against a portion near an opening of the airbag cover 5. During the same stage of airbag deployment, the airbag 200 of the related art, in contrast, protrudes upward more than the airbag 2 of the embodiment does because the airbag 200 is generally folded to be easily released upward from the airbag cover 5.

When gas is further supplied into the airbag 2, the top portion 23 side of the flap portion 25 moves while turning toward the occupant about the rolled portion pressed against the airbag cover 5, as shown in a third stage of FIG. 3A. During the same stage of airbag deployment, the airbag 200 of the related art, in contrast, protrudes upward more than the airbag 2 of the embodiment does because the airbag 200 is folded to be easily released upward from the airbag cover 5, and the airbag 200 is inflated and deployed along the windshield W.

When gas is further supplied into the airbag 2, the top portion 23 is inflated and deployed along with turn of the top portion 23 side of the flap portion 25, and a back surface of the flap portion 25 (a surface on the vehicle front side) is inflated and deployed toward the windshield W, as shown in a fourth stage of FIG. 3B. At this time, the rolled portion pressed against the airbag cover 5 is gradually unrolled along with inflation and deployment of the airbag 2. During the same stage of airbag deployment, the airbag 200 of the related art, in contrast, is inflated and deployed upward along the windshield W, and the whole airbag 200 is drawn into the vehicle and is going to inflate and deploy downward.

When gas is further supplied into the airbag 2, as shown in a deployment completed state of FIG. 3C, the flap portion 25 is inflated and deployed toward the occupant to form the contact surface 21a, the rolled portion pressed against the airbag cover 5 is completely unrolled, and the bottom portion 24 is inflated and deployed between the occupant and the instrument panel I. During the same stage of airbag deployment, the airbag 200 of the related art, in contrast, is inflated and deployed into a substantially similar shape. In FIG. 3C, one-dot chain lines for separating the restraint portion 21, the base portion 22, the top portion 23, and the bottom portion 24 are mere virtual boundary lines.

Because the airbag 200 of the related art is inflated and deployed upward along the windshield W and is then inflated and deployed downward, the gas greatly moves up and down in the airbag 200, thereby creating a tendency for the airbag 200 to bounce up and down. However, in the airbag 2 of the embodiment, since the top portion 23 is inflated and deployed along with turn of the flap portion 25, upward and downward movement of the gas during the inflation step of the airbag 2 can be reduced, thereby reducing upward and downward bounce of the airbag 2.

As described above, in the embodiment, the flap portion 25 formed by the restraint portion 21 can control a behavior of the airbag 2 during inflation and deployment by moving while turning, thereby preventing the airbag 2 from bulging upward and interfering with the occupant in an early stage of deployment. In particular, since the flap portion 25 is formed by folding a part of the airbag 2, it is unnecessary to use a separate component and to add an extra production process, thereby preventing an increase in the weight of the airbag device 1 and the folded volume of the airbag 2.

As described above, in the embodiment, the bottom portion 24 is wrapped in the top portion 23 such as to be confined from the vehicle front side (windshield W side), and the top portion 23 is wrapped in the flap portion 25 such as to be confined from the vehicle front side (windshield W side). Hence, the airbag 2 can be inflated and deployed in the order of the flap portion 25, the top portion 23, and the bottom portion 24.

Figure 8:
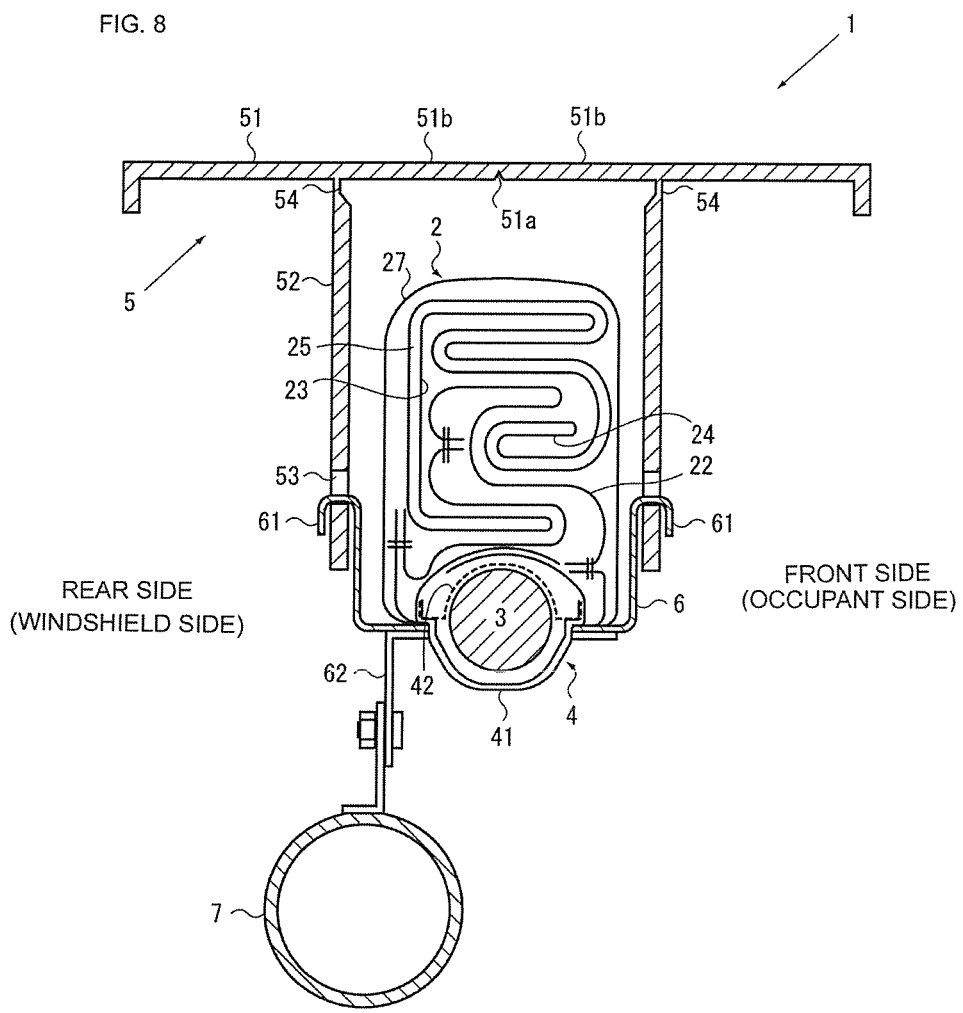
FIG. 8 shows a cross sectional view of an airbag device according to a second embodiment of the present invention.
Figure 9A:
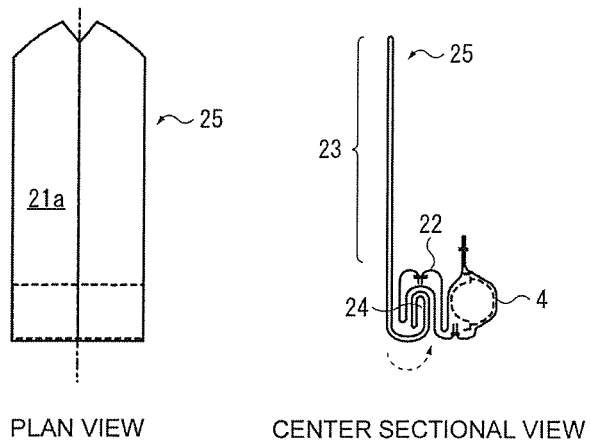
FIG. 9A shows a third folding step.
Figure 9B:
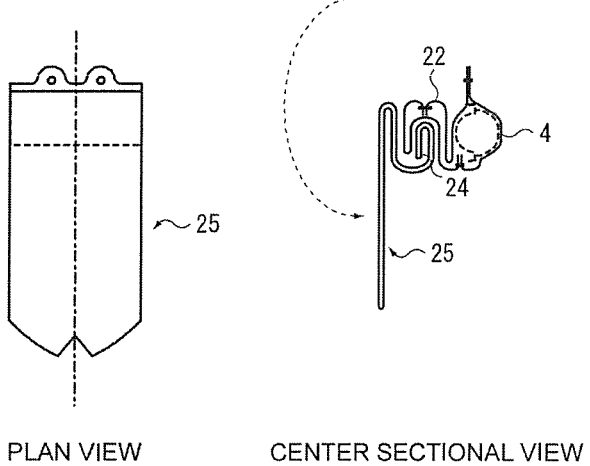
FIG. 9B shows a first stage in a fourth folding step.
Figure 9C:
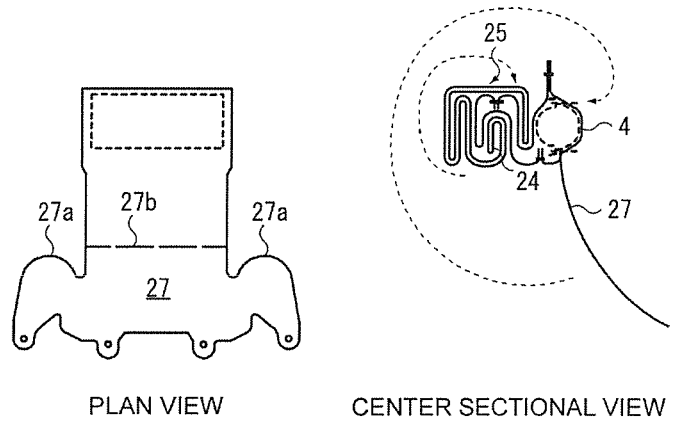
FIG. 9C shows a second stage in the fourth folding step.

An airbag device and an airbag folding method according to a second embodiment of the present invention will be described with reference to FIGS. 8 and 9. FIG. 8 shows a cross-sectional view of the airbag device according to the second embodiment of the present invention. FIG. 9 shows a folding method for an airbag shown in FIG. 8, wherein FIG. 9A shows a third folding step, FIG. 9B shows a first stage in a fourth folding step, and FIG. 9C shows a second stage in the fourth folding step. The same reference numerals will be used to designate the same components as those of the airbag device 1 and the folding method for the airbag 2 according to the above-described first embodiment, and redundant descriptions thereof will be omitted.

An airbag device 1 shown in FIG. 8 has the same structure as that of the airbag device 1 shown in FIG. 1, but is different only in a folding method for an airbag 2. In the airbag 2 shown in FIG. 8, only the rolled portion of the flap portion 25 on the bottom portion 24 side is tucked under the pleated base portion 22. That is, a portion of the flap portion 25 pleated on the base portion 22 is not tucked under the pleated base portion 22. According to such a structure, the flap portion 25 can be folded to move while turning toward the occupant upon inflation and deployment of the airbag 2, and the airbag 2 can be inflated and deployed in substantially the same manner as the inflation and deployment behavior shown in FIGS. 2 and 3, similarly to the airbag 2 of the first embodiment.

The folding method for the airbag 2 according to the above-described second embodiment is the same as that according to the first embodiment in the steps shown in FIGS. 5 and 6, from a flatly spreading step to a second folding step, and a wrapping step. A third and a fourth folding steps will be described below with reference to FIGS. 9A-9C.

In the third folding step shown in FIG. 9A, a bottom portion 24 side of a flap portion 25 is folded to be housed in an airbag cover 5. The bottom portion 24 side of the flap portion 25 is rolled downward (toward an inflator side) toward a pleated base portion 22 in a direction of an arrow in the figure.

In the fourth folding step shown in FIGS. 9B and 9C, a top portion 23 side of the flap portion 25 is folded to be housed in the airbag cover 5. More specifically, the top portion 23 side of the flap portion 25 shown in FIG. 9A is folded once in a direction of an arrow in the figure, so that the flap portion 25 is pleated on the base portion 22, as shown in FIG. 9B.

Subsequently, an end of the flap portion 25 projecting from the folded airbag 2 is folded to cover the pleated base portion 22 in a direction of an arrow in FIG. 9C. At this time, when the end of the flap portion 25 is tucked under the pleated base portion 22, the shape of the folded airbag 2 can be maintained stably. As a result, the whole airbag 2 can be folded on a retainer 4 into a size such as to be housed in the airbag cover 5, as shown in FIG. 9C.

While the present invention is applied to the passenger airbag device in the above-described embodiments, it may be applied to a driver airbag device, a side airbag device, a curtain airbag device, a knee airbag device, a pedestrian airbag device, etc. as long as the airbag device can have a similar structure.

The present invention is not limited to the above-described embodiments, and the airbag 2 may be a single bag formed by three foundation cloth pieces, for example. It goes without saying that various changes may be made without departing from the spirit of the present invention.

What is claimed is:

1. An airbag device installed in a vehicle comprising:
    an airbag that is folded up in a normal state and is inflated and deployed in case of an emergency;
    an inflator for supplying gas to the airbag; and
    a retainer that fixes the airbag and the inflator, the airbag comprising:
        a restraint portion to be located in front of an occupant upon inflation and deployment;
        a base portion connected to the inflator;
        a top portion to be located on a windshield side upon inflation and deployment; and
        a bottom portion to be located between the occupant and an instrument panel upon inflation and deployment, and
    wherein at least the restraint portion forms a flap portion by folding both right and left ends of the restraint portion inward so that the flap portion has an elongated belt shape having a width substantially equal to that of a width of the retainer with a contact surface of the restraint portion for contact with the occupant facing up,
    wherein the flap portion is folded so as to move while turning toward the occupant upon inflation and deployment of the airbag, and
    wherein the bottom portion is folded and wrapped in at least one of the other portions of the airbag such that the bottom portion remains folded spaced from and below the deploying flap portion as the flap portion is turning toward the occupant during inflation and deployment of the airbag.

2. The airbag device according to claim 1, wherein the flap portion is folded to cover the folded airbag from a rear side of the vehicle toward a front side of the vehicle.

3. The airbag device according to claim 1, wherein the bottom portion is wrapped in the top portion such as to be confined from a front side of the vehicle.

4. The airbag device according to claim 1, wherein the flap portion includes a planar portion formed by the top portion and the bottom portion.

5. An airbag folding method for an airbag in an airbag device installed in a vehicle, the airbag device comprising:
    the airbag that is folded in a normal state and is inflated and deployed in case of an emergency;
    an inflator for supplying gas to the airbag; and
    a retainer for fixing the airbag and the inflator, the airbag comprising:
        a restraint portion to be located in front of an occupant upon inflation and deployment;
        a base portion connected to the inflator;
        a top portion to be located on a windshield side upon inflation and deployment; and
        a bottom portion to be located between the occupant and an instrument panel upon inflation and deployment,
    wherein the airbag folding method comprises:
        a flatly spreading step of flatly spreading out the airbag by pushing the airbag down so that a contact surface of the restraint portion faces up and the bottom portion has the the top portion thereon and the top portion has the restraint portion thereon;
        a first folding step of folding the base portion to be placed on the retainer, and forming a planar portion on the base portion by folding the airbag so that the restraint portion contact surface of the planar portion faces in a direction away from the retainer, an upper portion of the planar portion faces in a direction toward the retainer and is formed by a part of the bottom portion, and a lower portion of the planar portion faces in the direction toward the retainer and is formed by a part of the top portion;
        a second folding step of forming a flap portion by folding both right and left ends of the planar portion inward so that the planar portion has an elongated belt shape and a width substantially equal to that of a width of the retainer;
        a third folding step of folding a bottom portion side of the flap portion so that the bottom portion side is tucked under the base portion from a rear side of the vehicle; and
        a fourth folding step of pleating a remaining portion of the flap portion on the base portion and then folding a top portion side of the flap portion to cover the base portion from a front side of the vehicle.

6. The airbag folding method according to claim 5, wherein the bottom portion side of the flap portion is rolled toward the inflator in the third folding step.

7. The airbag folding method according to claim 5, wherein an end of the flap portion is tucked under the base portion in the fourth folding step.

8. The airbag folding method according to claim 5, wherein the pleated portion of the flap portion is tucked under the base portion in the fourth folding step.

9. The airbag folding method according to claim 5, further including a wrapping step of wrapping the folded airbag in a wrapping member to maintain a shape after the fourth folding step.

10. A method of folding an airbag so that when inflated and deployed the airbag has a base portion connected to an inflator, a bottom portion for being located between a vehicle occupant and an instrument panel, a top portion to be located in engagement with the windshield, and a restraint portion to be located for engagement by a vehicle occupant, the method of folding the airbag comprising:
    folding the base portion, the bottom portion, the top portion, and the restraint portion;
    wrapping the folded base portion on the folded bottom portion;
    wrapping the folded top portion on the folded base portion; and
    wrapping a flap portion of the airbag including the folded restraint portion thereof on the folded top portion such that with the airbag deploying and inflating, the bottom portion remains folded spaced from and below the deploying flap portion as the flap portion turn towards the occupant about the folded bottom portion.

* * * * *